US012678851B2

(12) United States Patent
Benchieb et al.

(10) Patent No.: US 12,678,851 B2
(45) Date of Patent: Jul. 14, 2026

(54) METHOD FOR PRODUCING A DEVICE FOR MOVING A WORKPIECE FROM A FIRST TOOL INTO A SECOND TOOL, ELECTRONIC COMPUTING UNIT, COMPUTER PROGRAM PRODUCT AND COMPUTER-READABLE MEDIUM

(71) Applicant: Bayerische Motoren Werke Aktiengesellschaft, Munich (DE)

(72) Inventors: Maximilian Benchieb, Eichenau (DE); Julian Chander, Munich (DE); Ingo Heinle, Inzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 331 days.

(21) Appl. No.: 18/261,769

(22) PCT Filed: Dec. 2, 2021

(86) PCT No.: PCT/EP2021/083880
§ 371 (c)(1),
(2) Date: Jul. 17, 2023

(87) PCT Pub. No.: WO2022/152457
PCT Pub. Date: Jul. 21, 2022

(65) Prior Publication Data
US 2024/0075513 A1    Mar. 7, 2024

(30) Foreign Application Priority Data
Jan. 18, 2021    (DE) ..................... 10 2021 100 842.5

(51) Int. Cl.
*B21D 43/05*    (2006.01)
*G05B 19/418*    (2006.01)

(52) U.S. Cl.
CPC ........... *B21D 43/05* (2013.01); *G05B 19/418* (2013.01)

(58) Field of Classification Search
CPC .............................. B21D 43/05; G05B 19/418
See application file for complete search history.

(56) References Cited

U.S. PATENT DOCUMENTS 5,023,790 A * 6/1991 Luke, Jr. .............. G05D 1/0265
                                                    318/587
5,186,593 A * 2/1993 Tsukada ................... B23Q 7/04
                                                    413/19
(Continued)

FOREIGN PATENT DOCUMENTS

CN        2858101 Y      1/2007
CN      105550393 A      5/2016
(Continued)

OTHER PUBLICATIONS

PCT/EP2021/083880, International Search Report dated Apr. 4, 2022 (Two (2) pages).
(Continued)

*Primary Examiner* — Kidest Worku
(74) *Attorney, Agent, or Firm* — Crowell & Moring LLP

(57) ABSTRACT

A method for producing a device includes, by an electronic computing unit, determining a nominal value of a nominal property of the device to be produced and/or of a movement apparatus for moving the device in space. By the electronic computing unit, comparing the nominal value with actual values of a property of respective already produced devices and/or of an already produced movement apparatus, where a respective difference between the nominal value and the respective actual value is determined in the comparing. By the electronic computing unit, displaying an item of information on an electronic display, where the information characterizes one of the already produced devices, where (Continued)

one of the actual values belongs to the one device characterized by the information, and where one of the differences was determined on a basis of the one actual value belonging to the device characterized by the information.

10 Claims, 1 Drawing Sheet

(56) References Cited

U.S. PATENT DOCUMENTS

| | | | |
|---|---|---|---|
| 6,625,607 | B1 | 9/2003 | Gear et al. |
| 7,287,950 | B2 | 10/2007 | Schmeink et al. |
| 2004/0138772 | A1 * | 7/2004 | Barman ............. G05B 19/4097 |
| | | | 705/400 |
| 2007/0124013 | A1 * | 5/2007 | Weber ................... G05B 19/19 |
| | | | 700/159 |
| 2011/0154962 | A1 * | 6/2011 | Lin ...................... B23Q 39/024 |
| | | | 82/158 |
| 2013/0319194 | A1 * | 12/2013 | Reiter .................. B21D 28/265 |
| | | | 83/130 |
| 2020/0230816 | A1 | 7/2020 | Diankov et al. |
| 2021/0078126 | A1 * | 3/2021 | Steinkopf .............. B23Q 15/22 |

FOREIGN PATENT DOCUMENTS

| | | | | |
|---|---|---|---|---|
| CN | 110465960 | A | 11/2019 | |
| DE | 19850259 | A1 * | 5/2000 | ............. G01B 21/04 |
| DE | 102 59 814 | B9 | 7/2003 | |
| DE | 10 2004 018 059 | B4 | 11/2005 | |
| DE | 10 2014 004 654 | A1 | 10/2014 | |
| DE | 102013207309 | A1 * | 10/2014 | ........... B21D 43/025 |
| EP | 3 382 630 | A1 | 10/2018 | |

OTHER PUBLICATIONS

German Search Report issued in German application No. 10 2021 100 842.5 dated Sep. 23, 2021, with Statement of Relevancy (Six (6) pages).

Andriy Bakshalov, "Similarity Analysis Between Groups of Construction Objects in BIM Application", *Metropolia University of Applied Sciences, Master's Thesis*, Mar. 10, 2020, 58 pp., URL: https://www.theseus.fi/bitstream/handle/10024/333645/Bakshalov_ Andriy.pdf.

Ronald List, "CATIA V5—Grundkurs fuer Maschinenbauer", *Bauteil- und Baugruppenkonstruktion, Zeichnungsableitung*, 8. Auflage, Springer Vieweg, 2017, 14 pp.

English translation of Chinese-language Office Action issued in Chinese Application No. 202180079043.1 dated Nov. 11, 2025 (10 pages).

* cited by examiner

1

METHOD FOR PRODUCING A DEVICE FOR MOVING A WORKPIECE FROM A FIRST TOOL INTO A SECOND TOOL, ELECTRONIC COMPUTING UNIT, COMPUTER PROGRAM PRODUCT AND COMPUTER-READABLE MEDIUM

BACKGROUND AND SUMMARY OF THE INVENTION

The invention concerns a method for producing a device for moving a workpiece from a first tool into a second tool. The invention also concerns an electronic computing unit and a computer program product. The invention furthermore concerns a computer-readable medium.

DE 102 59 814 A1 discloses a workpiece transfer process for a clean pressing line in which a plurality of presses are arranged along a workpiece transfer direction. DE 10 2004 018 059 B4 also discloses a transfer device for a transfer press.

The object of the present invention is to provide a method, an electronic computing unit, a computer program product and a computer-readable medium, so that in a particularly time- and cost-favorable fashion, a device can be produced by means of which a workpiece can be moved or transferred from a first tool for machining the workpiece into a second tool for machining the workpiece.

A first aspect of the invention comprises a method for producing a device by means of which a workpiece can be moved, i.e., shifted, transported or transferred, from a first tool for machining the workpiece into a second tool for in particular further machining of the workpiece. The first tool is for example a forming tool, in particular a press, by means of which the workpiece can be shaped, in particular deep-drawn, in particular by pressing. The second tool may be a further forming tool or a separating tool, in particular a cutting tool, by means of which for example the shaped workpiece can be cut or a first part region of the workpiece can be separated, in particular cut or punched out, from a second part region. For example, the tools are arranged successively along a movement or transfer direction and form part of a press, in particular configured as a pressing line, by means of which the workpiece can be machined accordingly. In order to machine the workpiece along the pressing line by means of the tools, the device is used in particular such that the workpiece is moved by means of the device along the transfer direction from tool to tool, i.e., from the first tool into the second tool. In yet other words, after the workpiece has been machined by the first tool, the workpiece machined by the first tool is taken from the first tool by means of the device, moved to the second tool and laid in the second tool, whereupon the workpiece laid in the second tool can be machined, in particular further machined, by means of the second tool.

Usually, it is very time-consuming and cost-intensive to design and produce a device for moving the workpiece from tool to tool. In order now to be able to design and produce the device for moving the workpiece particularly easily and hence time- and cost-favorably, in a first step of the method it is provided that by means of an electronic computing unit, at least one first nominal value of at least one nominal property of the device to be produced, and/or of a movement apparatus for moving the device in space, is determined. This means that the nominal property is a property of the device to be produced, and/or the nominal property is a property of a movement apparatus by means of which the device, and via the device the workpiece, can be moved in space. The movement apparatus is for example a robot, in particular configured as an industrial robot, which for example may have multiple robot arms or robot axes which are movably connected together, in particular in articulated fashion. In the final produced state of the tool line, the device is held in particular reversibly releasably on the movement apparatus, so that the movement apparatus can move the device around in space. The workpiece to be transported, i.e., to be moved, can be held in particular reversibly and hence non-destructively releasably on the device, and via the device on the movement apparatus, so that by means of the movement apparatus, the device and via the device the workpiece can be moved around in space.

In a second step of the method, by means of the electronic computing unit, the nominal value is compared with actual values stored in a data memory, in particular of the electronic computing unit, of the property of respective devices which have already been produced and/or designed, and/or of a movement apparatus for moving the device which has already been produced and/or designed. In other words, the actual values are stored in the data memory. The actual values are values, so that actual values relate to the same property as the nominal value, wherein the actual values do not relate to the device to be produced, but the actual values relate to the property and to devices already produced and/or designed, and/or to a movement apparatus for moving the device already produced and/or designed. Expressed in yet other words, the nominal value characterizes or quantifies the property of the device to be produced and/or the movement apparatus for moving the device in space, so that the nominal value relates to the property, and in addition the nominal value relates to the device to be produced and/or to the movement apparatus for moving the device in space. The respective actual value characterizes or quantifies the property of a respective device already produced and/or designed, and/or the respective actual value characterizes or quantifies the property of the movement apparatus or a further movement apparatus for moving the device already produced and/or designed. Thus the respective actual value relates to the same property to which the nominal value relates. Also, the respective actual value relates to a device already produced and/or designed, and/or the respective actual value relates to a movement apparatus for moving the respective device already produced and/or designed. The nominal value, the respective actual value and the property will be explained in more detail with reference to the following greatly simplified example: For example, the property may be a dimension, in particular an external dimension of the device. The nominal value for example quantifies at least the dimension of the device to be designed and produced, and/or the nominal value quantifies the dimension of the movement apparatus for moving the device to be produced or designed. Alternatively or additionally, the property may be an orientation, a distance, in particular a spot distance between a sucker center point and a tube axis or a clamp center point, a distance between two points of two elements of the device and/or the movement apparatus.

Accordingly, the respective actual value quantifies the size of an existing device, i.e., one already produced and/or designed, and/or the respective actual value characterizes the size of the movement apparatus or another movement apparatus for moving the device already produced and/or designed. Since the nominal value and the respective actual value relate to the same property, i.e., characterize the same property but of different devices, the nominal value and the actual value can be compared with one another. Thus in the second step of the method, it is also provided that in the comparison, a respective difference between the nominal value and the respective actual value is determined, in particular calculated, by means of the electronic computing unit.

In a third step of the method, by means of the electronic computing unit, at least one item of information is displayed on an electronic display known as a screen. The information characterizes or defines at least one of the devices which have already been produced and/or designed, wherein one of the actual values belongs to the at least one device which has already been produced and/or designed and is characterized by the information, and wherein one of the differences was determined on the basis of the one actual value belonging to the device which has already been produced and/or designed and is characterized by the information. In other words, since the respective actual value relates to the respective device already produced and/or designed, or to the respective movement apparatus for moving the device already produced and/or designed, the respective actual value belongs to the device to which the respective actual value relates, or the respective actual value relates to the device already produced and/or designed which is movable by the movement apparatus to which the respective actual value relates. Since the respective difference between the nominal value and the respective actual value is determined, the respective difference is determined using the respective actual value. The information which is displayed on the display, and in particular can be perceived optically by a person, now communicates to the person the device already produced and/or designed to which the actual value belongs, from which one of the differences was determined. For example, depending on criterion, on the basis of which the device already produced and/or designed was selected and is characterized by the information, the device characterized by the information resembles the device to be produced greatly, or the device characterized by the information and already produced and/or designed corresponds to the device to be produced, or may be used as the device to be produced. The device already designed and/or produced and characterized by the information may thus be used by the person as a starting basis, and the new device to be designed or produced may in some cases be designed and finally produced with minor changes to the device characterized by the information. In contrast to a completely new design of the device to be produced, thus the device to be produced can be designed and produced considerably more time- and cost-favorably. It is conceivable that there are different types or different groups of designs, wherein it may be advantageous here to indicate in targeted fashion various types of design for which the difference between the actual and nominal value is low or which fulfil the at least one criterion.

In one embodiment of the invention, it may be provided that during the comparison, it is determined that at least one of the differences lies below a threshold value, wherein the information characterizes the one of the devices already produced and/or designed to which the actual value belongs, using which the at least one difference lying below the threshold value was determined. Since for example the difference lies below the threshold value and for example is zero, the device characterized by the information resembles the device to be produced greatly, or the device characterized by the information and already produced and/or designed corresponds to the device to be produced or can be used as the device to be produced. Thus the device to be produced can be designed and finally produced in a particularly time- and cost-favorable manner.

In a further, particularly favorable embodiment of the invention, it is provided that depending on at least one criterion, an order of differences is produced, and a corresponding order of devices already produced and/or designed to which the actual values belong, using which the differences were determined, wherein the information characterizes the devices forming the order and already produced and/or designed, and their order. Thus the person may be given a selection of fundamentally suitable devices, or of devices which are suitable as advantageous starting points for the design and production of the device. In particular, it may be provided that the order is structured such that the devices already produced and/or designed form a list for example The invention is based in particular on the following knowledge and considerations: pressing lines for the production of bodywork components usually comprise a succession of tools which, in particular depending on the component to be produced, may be configured as presses or other tools. In a first of the presses for example, workpieces, e.g., metal blanks are shaped, e.g., deep-drawn. This results in the workpiece or a so-called drawn part, which is also known as a workstation part. The respective pressing line furthermore has at least one robot or robot arm which moves the drawn part, after shaping, from the first press into a second press of the presses. In particular, a respective tool is mounted in the respective press, wherein the workpiece is shaped by means of the tool of the first press. By means of the tool of the second press, for example, the workpiece is cut. Then for example, by means of the robot or robot arm or by means of a further robot or a further robot arm, the cut workpiece may be moved from the second press or from the tool of the second press into a third tool. For moving the workpiece between the tools or from tool to tool, also known as transport, a device is used which is firstly held on the robot or robot arm and thus can be moved around in space by means of the robot or robot arm, and secondly configured to secure the workpiece, in particular reversibly releasably. Thus the workpiece may, for example, be initially secured on the device in order to bring the workpiece out of the first tool. Then the workpiece is detached from the device in order to leave the workpiece, after it has been laid in a second tool, in the second tool and move the device away from the workpiece. The holding or fixing of the workpiece on the device, and the release of the workpiece from the device, are reversible, i.e., non-destructive.

Normally, a specific device is required for each production process and each process step, and is adapted specifically to the respective production process or process step. For example, the device may have suction cups and/or other holding elements which allow it to temporarily fix, i.e., to hold or secure, the drawn part, in particular non-destructively, on the device. For example, there is a high number of standardized assemblies for attaching the holding elements to the robot or robot arm. The number is, for example, around 40. This means that the device may comprise at least one of the assemblies and can be connected, in particular reversibly releasably, to the robot or robot arm via the assembly. In other words, the device may be formed by one of the assemblies or by multiple assemblies, i.e., be constructed from assemblies. Thus the assembly or one of the assemblies from which the device is constructed may for example be an interface, via which the device or the holding elements can be connected to the robot or robot arm. The respective assembly may usually be geometrically adapted to a certain degree, or allow geometric adaptation of the device. For this, the assembly or the device comprises for example at least two components which are connected together via at least one joint, in particular such that the components are pivotable relative to one another into at least two different positions. At least one fixing element may be provided here, by means of which the components can be or are fixed in the positions relative to one another. Thus the joint allows geometric changes of the respective assembly or device, in particular by opening and closing the fixing element, formed for example as a screw. For example, when the components are in a first of the positions and fixed relative to one another in the first position, the assembly or the device or at least a part region thereof has a first form, and the assembly or device has a second form, which is different from the first form at least in the part region, when the components are in the second position and fixed relative to one another in the second position, in particular by means of the fixing element.

In order to design a device for the movement of a workpiece, known as transport, in particular from tool to tool, usually for each device several of these assemblies must be selected, and also geometric changes of the individual assemblies must be designed. Because of the high number of different assemblies and types of assemblies, and because of an additionally high number of degrees of freedom for modification of a respective geometry of the respective assemblies, it is very time- and hence cost-intensive to design and finally produce the respective assembly. In this respect, it should be noted that the geometric change or changeability of the respective assembly is subject to restrictions. For example, the components of the assembly connected together via the joint cannot move, in particular rotate, arbitrarily relative to one another without collision. Furthermore, collisions between the assemblies may occur, or the assemblies may intersect or exceed or infringe boundaries of a permitted installation space for the device.

As already described above, the device may be formed by precisely one assembly, or it is preferably provided that the device is formed by multiple assemblies which are each produced or mounted separately from one another and connected together to form the device. Thus in particular it is provided that a quantity of assemblies, such as two or more assemblies, form the device. The comparison of nominal and actual values may take place at the level of the individual assemblies and/or at the level of the device formed from the assemblies, wherein the latter may be advantageous in particular for standard parts.

In order now to be able to design and finally produce the device in a particularly time- and cost-favorable fashion, in the context of the invention it is provided to use devices already produced or designed in order to generate a design proposal which is as complete as possible for the person responsible for the design and production of the new device. This maximally complete design proposal is the device characterized by the information and already produced and/or designed.

The respective device already produced and/or designed is also referred to below as the former device or former design. For example, it is provided to determine parameters and/or conditions which describe a respective geometric adaptation of the former designs, in particular of assemblies of the former designs, and for example store these in the data memory as the actual values. The actual values are linked to the property to which the nominal value also relates. Thus the former design or former designs may be found which at least resemble or even correspond to the new device to be designed and produced.

For this, the nominal value of the property is determined. Then, for example by means of an algorithm, a search is performed for at least one former design which, in particular with respect to its actual value, deviates as little as possible from the desired nominal value.

In this context, it is conceivable that the information comprises a list of former designs which at least resemble the device to be produced. Alternatively or additionally, different types of assemblies may be sought. Thus using the information, with only very little effort, the person may be given a proposal or several proposals for an advantageous former design which can be used as the device to be produced or as a starting point for producing the desired device.

Preferably, the found assemblies or designs of the found assemblies have no internal collisions. Further cases of restrictions may in some cases be disregarded, and a precise observation of required properties may not necessarily be ensured. However, in comparison with a completely fresh start, a substantial saving in cost and time can be achieved by the method according to the invention.

Integration of the invention in design software is not absolutely essential but is particularly advantageous for being able to design and produce the device in a particularly time- and hence cost-favorable fashion.

The device may be designed and produced in a particularly time- and cost-favorable fashion if the property concerns a distance between a fixing element of the respective device which can be fixed, in particular reversibly releasably, to the respective movement apparatus by means of the fixing element, and a receiving region (also referred to below as a receiving point) in which the respective workpiece is to be held reversibly, i.e., non-destructively, releasably on the respective device. The receiving region or receiving point is also known as the fixing point at or in which the workpiece may be held on the device or received by the device.

Alternatively or additionally, the property may comprise directional information, such as for example an axis of a fixing element, an axis of a receiving region. If the device comprises for example suckers or suction cups, in particular as the assembly, an axis of symmetry of the respective suckers may be used as the axis which may be regarded as the property.

A further embodiment is distinguished in that as the property, a physical orientation is used of an element of the respective movement apparatus, on which element the respective device can be fixed, in particular reversibly or non-destructively releasably. Thus the device may be designed particularly time- and cost-favorably.

It has proved particularly advantageous if a rod is used as the element. For example, as the property, an axis is used which describes the orientation of the rod in space, i.e., the spatial orientation of the rod on which the device or the assembly, i.e., for example the device via the assembly, is mounted or can be mounted on the movement device. This property has proved particularly advantageous in order, starting from the former designs, to be able to design and produce the device particularly easily and hence time- and cost-favorably.

In a further particularly advantageous embodiment of the invention, as the property, a surface normal and/or a direction of a surface normal is used which runs through a fastening point, also known as a fixing point, of the respective device, in particular the assembly, at the fixing point of which (which for example is the above-mentioned fixing or fastening point) the respective workpiece is to be reversibly or non-destructively releasably held or secured on the respective device.

In order to be able to find former designs, in particular as a starting point for design and production of the desired device, in a particularly simple and precise fashion, in a further embodiment of the invention it is provided that determination of the nominal value comprises that, by means of the electronic computing unit, in particular by means of a detection and/or input device of the electronic computing unit, at least one input caused by a person is detected from which the nominal value results and/or which characterizes the nominal value.

Overall, it is found that the method according to the invention provides a basis for producing the design or device in a particularly time- and cost-favorable fashion.

A further embodiment is distinguished in that the device is actually produced depending on the displayed information.

A second aspect of the invention concerns an electronic computing unit which is configured to perform the method according to the first aspect of the invention. Advantages and advantageous embodiments of the first aspect of the invention should be regarded as advantages and advantageous embodiments of the second aspect of the invention and vice versa.

A third aspect of the invention concerns a computer program product comprising commands which cause the electronic computing unit according to the second aspect of the invention to carry out the method according to the first aspect of the invention. Advantages and advantageous embodiments of the first and second aspects of the invention should be regarded as advantages and advantageous embodiments of the third aspect of the invention and vice versa.

Finally, a fourth aspect of the invention concerns a computer-readable medium on which the computer program product according to the third aspect of the invention is stored. Advantages and advantageous embodiments of the first, second and third aspects of the invention should be regarded as advantages and advantageous embodiments of the fourth aspect of the invention and vice versa.

Further details of the invention arise from the following description of a preferred exemplary embodiment with the associated drawings.

DETAILED DESCRIPTION OF THE DRAWINGS

Figure 1:
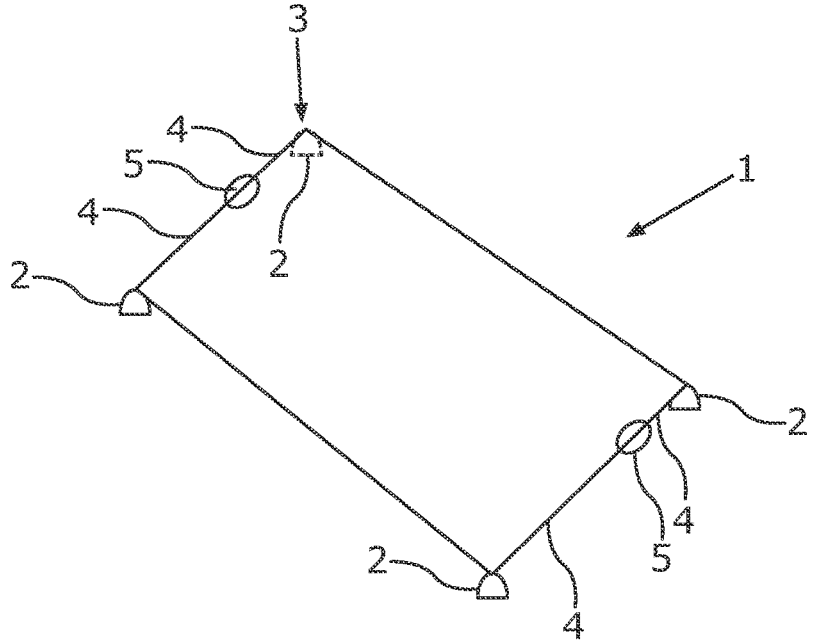
FIG. 1 is a schematic, perspective view of a device for moving a workpiece from a first tool for machining the workpiece into a second tool for machining the workpiece.

FIG. 1 shows in a schematic, perspective view a device 1 by means of which a workpiece can be or is moved, i.e., can be or is transported, transferred or shifted, from a first tool for machining the workpiece into a second tool for machining the workpiece. The device 1 is used for example in a tool line, configured in particular as a pressing line. The pressing line comprises for example at least two presses arranged successively along a transport direction. A first of the presses comprises the above-mentioned first tool, and the second press, following the first press along the transport direction, comprises for example the above-mentioned second tool.

For example, a component is produced from the workpiece. For this, the workpiece is firstly laid in the first tool while the first press is open. Then the first press is closed, whereby the workpiece is for example shaped, in particular deep-drawn, by means of the first press and the first tool. Then the first press or the first tool is opened again. Then by means of the device 1, the shaped workpiece is taken from the first tool. For this, the device 1 comprises holding elements in the form of suction cups 2, by means of which the shaped workpiece is held, i.e., fixed or secured, non-destructively releasably and temporarily, i.e., provisionally, on the device 1. Furthermore, the device 1 is held, in particular reversibly or non-destructively releasably, on a robot arm of a robot (not shown in FIG. 1). By means of the robot, the device 1 and via this the shaped workpiece, held non-destructively releasably on the device 1, are moved in space such that the shaped workpiece is taken from the first tool and laid in the second tool while the second press is open. Then the workpiece is detached from the device 1, in particular from the suction cups 2, and the device 1 is moved away from the second tool by means of the robot. Then the second press is closed, whereby for example the shaped workpiece is mechanically separated, in particular cut, by means of the second tool.

The device 1 comprises an assembly 3, configured for example as a frame, via which the device 1 and hence the suction cups 2 are attached, in particular reversibly releasably, on the robot arm. The respective suction cup 2 or suction cups 2 as a whole may form a further assembly of the device 1. The assembly 3 comprises for example respective components 4 which are connected together in articulated fashion via a respective joint 5. Thus for example the components 4 may be moved, in particular pivoted, relative to one another into at least two different positions. Also, the device 1, in particular its joint 5, may comprise at least one fixing element by means of which the respective components 4 can be fixed relative to one another in the respective position. When the components 4 are in a first of the positions and the components 4 are fixed relative to one another in the first position by means of the respective fixing element, then for example the device 1 has a first form. When the components 4 are for example in the second position and the components 4 are fixed relative to one another in the second position by means of the respective fixing element, then for example the device 1 has a second form different from the first.

Figure 2:
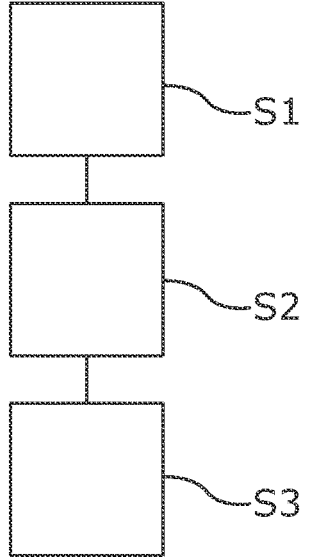
FIG. 2 is a block diagram to illustrate a method according to the invention for producing the device.

Now with reference to FIG. 2, a method is described by means of which the device 1 can be designed and produced in a particularly time- and cost-favorable fashion. As will be explained in more detail below, the method uses existing i.e., former constructions which have already been and/or are used to produce components. The respective former construction is thus a device already produced and/or designed, which was designed and/or produced chronologically before the device 1, in particular in collaboration with a movement apparatus by means of which the former construction can be and/or was moved, using the former construction, in order thereby to machine, in particular form, components. The above-mentioned movement apparatus may mean the above-mentioned robot and/or the above-mentioned movement apparatus means a further, other robot of the same apparatus for moving the former construction. For example, the former construction and the former movement apparatus are and/or were used in a production process for producing components, wherein for example it is intended and planned to use the device 1 in the context of a further new production process.

In a first step S1 of the method, by means of an electronic computing unit, at least one first nominal value of at least one first nominal property of the new device 1 to be designed and produced, and/or of the robot for moving the device 1 in space, is determined. For this for example a person entrusted with the design for producing the device 1, also known as the constructor, makes an input into the electronic computing unit which detects the input. The input results in the nominal value or the input characterizes the nominal value.

A data memory, in particular of the electronic computing unit, contains datasets which for example comprise actual values of the property of the former constructions and/or the movement apparatus intended and/or used for moving the former constructions. In a second step S2 of the method, the nominal value is compared with the actual values stored in the data memory. Since the nominal value and the actual values relate to the same property, wherein the nominal value also relates to the device 1 to be produced and/or to the robot, while the respective actual value also relates to the former construction and the movement apparatus, the nominal value and actual value can be compared with one another, in particular such that it can be determined which of the former constructions resembles or corresponds to the new desired device 1 to be designed and produced. In the comparison, by means of the electronic computing unit, a respective difference is determined between the nominal value and the respective actual value.

The respective difference is also described as a deviation. The respective calculation of the respective deviation may for example be relative. An invariance of the comparison from absolute coordinates may be advantageous for a success of the method. Furthermore, it is preferably provided that the actual construction of the respective assembly, i.e., of respective elements of the assembly, and the geometric parameters are not changed.

In a third step S3 of the method, by means of the electronic computing unit, at least one item of information is displayed on an electronic display, known as a screen, in particular of the electronic computing unit. The information can be perceived by a person, i.e., with the human eye and hence optically. The information defines or characterizes at least one of the devices already produced and/or designed, wherein one of the actual values belongs to the at least one device characterized by the information and already produced and/or designed, and wherein one of the differences was determined using the one actual value belonging to the device characterized by the information and already produced and/or designed. In particular, the information may characterize several or all of the devices already produced and/or designed, in particular such that the information visually perceptible by the person comprises a first order of the former designs, the first order of which corresponds to a second order of the determined or calculated differences belonging to the former designs forming the first order, wherein the differences and hence the former designs in the respective order are sorted by increasing differences or increasing or rising values of the differences.

The information thus notifies the person of the former design or designs which resemble or even correspond to the device 1. The information is thus an optical signal, by means of which the person is notified or visually informed of the former design strongly resembling the desired device 1. The former design characterized by the information constitutes a starting point with a high technological maturity, wherein starting from the starting point, the person may design and subsequently produced the device 1, in some cases with only minor changes and hence in a time- and cost-favorable fashion. Using the method therefore, the device 1 can be produced particularly time- and cost-favorably.

From the order, the person is presented with or offered several solutions, and hence in particular also solutions resulting from different types of assemblies. Since for example the nominal and actual values are multiple values or states, or in other words each describes a vector of these states, the comparison is made between components of the vectors. In order to be able to compare the individual former constructions, for example, a norm of the vector is calculated which describes the difference between the nominal and actual state. In calculation of the norm, it may be provided to give individual components of the vector a different weighting. Then after sorting the results of the calculation of the norms of the individual difference vectors, a rising sort may be performed. The lower the value of the norm, the better the nominal state correlates to the actual state, or the closer the actual value or actual state is to the nominal value or nominal state. In addition, each type of assembly has a clear designation in the form of a number or alphanumeric identification. The constructor may select the best candidates from this designation and the value of the norm.

LIST OF REFERENCE CHARACTERS

1 Device
2 Suction cup
3 Assembly
4 Component
5 Joint
S1-S3 Method steps

The invention claimed is:

1. A method for producing a device that moves a workpiece from a first tool for machining the workpiece into a second tool for machining the workpiece, comprising the steps of:

by an electronic computing unit, determining a nominal value of a nominal property of the device and/or of a movement apparatus configured to move the device in space;

by the electronic computing unit, comparing the nominal value with actual values, stored in a data memory, of a property of pre-existing devices and/or of a pre-existing movement apparatus so as to determine for each of the actual values a difference between the nominal value and the actual value; and by the electronic computing unit, displaying on an electronic display information characterizing at least one of the pre-existing devices, wherein the information is displayed based on the difference between the nominal value and the actual value of the at least one of the pre-existing devices, wherein the property is selectable from among at least one property comprising: a distance between (a) a fixing element of the pre-existing device configured to fixed the pre-existing device to the movement apparatus, and (b) a receiving region of the pre-existing device configured to releasably hold the workpiece on the pre-existing device.

2. The method of claim 1, wherein the information is displayed based on the difference being below a threshold value.

3. The method of claim 1, wherein the information is displayed based on an order of the differences.

4. The method of claim 1, wherein the at least one property further comprises a physical orientation of an element of the movement apparatus, and wherein the pre-existing device is configured to be fixed on the element.

5. The method of claim 4, wherein the element comprises a rod.

6. The method of claim 1, wherein the at least one property further comprises a surface normal that runs through a fixing point of the pre-existing device, wherein the pre-existing device is configured to releasably hold the workpiece at the fixing point.

7. The method of claim 1, wherein determining the nominal value comprises receiving, by the electronic computing unit, at least one user input characterizing the nominal value.

8. The method of claim 1, further comprising:

producing the device based on the displayed information.

9. An electronic computing unit configured to perform the method of claim 1.

10. A non-transitory computer-readable medium comprising commands which cause an electronic computing unit to carry out the method of claim 1.

\* \* \* \* \*